United States Patent
Kim et al.

(10) Patent No.: US 8,212,984 B2
(45) Date of Patent: Jul. 3, 2012

(54) METHOD OF MANUFACTURING AN IPS LCD DEVICE HAVING A LIGHT SHIELDING LAYER UNDER AT LEAST ONE COMMON OR DATA ELECTRODES SO THAT LIGHT TRANSMITTANCE AREAS OF THE COMMON AND DATA ELECTRODES ARE THE SAME

(75) Inventors: Gi Hong Kim, Anyang-shi (KR); Yun Bok Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 534 days.

(21) Appl. No.: 12/382,559

(22) Filed: Mar. 18, 2009

(65) Prior Publication Data

US 2009/0186551 A1    Jul. 23, 2009

Related U.S. Application Data

(62) Division of application No. 11/647,285, filed on Dec. 29, 2006, now Pat. No. 7,522,245, which is a division of application No. 10/777,852, filed on Feb. 13, 2004, now Pat. No. 7,173,682, which is a division of application No. 09/892,879, filed on Jun. 28, 2001, now Pat. No. 6,724,454.

(30) Foreign Application Priority Data

Oct. 20, 2000 (KR) ................... 2000-61934

(51) Int. Cl.
*G02F 1/1333* (2006.01)
*G02F 1/1343* (2006.01)

(52) U.S. Cl. .................. 349/141; 349/110; 349/139

(58) Field of Classification Search .................. 349/110, 349/139–141
See application file for complete search history.

(56) References Cited

U.S. PATENT DOCUMENTS 5,162,933 A    11/1992    Kakuda et al.
5,598,285 A    1/1997    Kondo et al.
(Continued)

FOREIGN PATENT DOCUMENTS

JP    09-005764    1/1997
(Continued)

OTHER PUBLICATIONS

R. Kieler et al.; "In-Plane Switching of Nematic Liquid Crystals"; Japan Display '92; pp. 547-550.
(Continued)

*Primary Examiner* — Huyen Ngo
(74) *Attorney, Agent, or Firm* — McKenna Long & Aldridge, LLP

(57) ABSTRACT

The present invention relates to a method of manufacturing an in-plane switching mode LCD, in which data electrodes and common electrodes in a unit pixel have the same light transmitting area to reduce the luminance difference according to positive or negative polarity of an applied DC voltage, the method of manufacturing comprise preparing the first and second substrates; forming a plurality of gate lines and data lines on the first substrate to define a plurality of pixel areas; forming a plurality of data electrodes and the common electrodes to be alternately formed in each pixel area and having the same light transmitting area in applying voltage; and forming a liquid crystal layer between the first and second substrates.

9 Claims, 11 Drawing Sheets

U.S. PATENT DOCUMENTS

| | | | |
|---|---|---|---|
| 5,745,207 A | 4/1998 | Asada et al. | |
| 5,905,556 A | 5/1999 | Suzuki et al. | |
| 5,907,379 A | 5/1999 | Kim et al. | 349/141 |
| 5,946,060 A | 8/1999 | Nishiki et al. | |
| 5,946,066 A | 8/1999 | Lee et al. | |
| 6,052,168 A | 4/2000 | Nishida et al. | 349/141 |
| 6,069,678 A | 5/2000 | Sakamoto et al. | |
| 6,094,250 A | 7/2000 | Choi et al. | 349/141 |
| 6,111,627 A * | 8/2000 | Kim et al. | 349/141 |
| 6,133,977 A | 10/2000 | Lee et al. | |
| 6,266,116 B1 | 7/2001 | Ohta et al. | |
| 6,271,903 B1 | 8/2001 | Shin et al. | |
| 6,281,953 B1 | 8/2001 | Lee et al. | |
| 6,400,435 B2 | 6/2002 | Son et al. | |
| 6,429,918 B1 | 8/2002 | Choi et al. | |
| 6,445,435 B1 | 9/2002 | Seo et al. | |
| 6,452,656 B2 | 9/2002 | Niwano et al. | 349/141 |
| 6,469,765 B1 * | 10/2002 | Matsuyama et al. | 349/143 |
| 6,525,798 B1 | 2/2003 | Yamakita et al. | 349/141 |
| 6,583,840 B1 * | 6/2003 | Inoue et al. | 349/141 |
| 2003/0112393 A1 * | 6/2003 | Watanabe et al. | 349/123 |

FOREIGN PATENT DOCUMENTS

| | | |
|---|---|---|
| JP | 09-073101 | 3/1997 |
| JP | 09-101538 | 4/1997 |
| JP | 09-105908 | 4/1997 |
| JP | 10-062812 | 3/1998 |
| JP | 411271810 A | 10/1999 |

OTHER PUBLICATIONS

M. Oh-e, et al.; "Principles and Characteristics of Electro-Optical Behaviour with In-Plane Switching Mode"; Asia Display '95; pp. 577-580.

M. Ohta et al.; "Development of Super-TFT-LCDs with In-Plane Switching Display Mode"; Asia Display '95; pp. 707-710.

S. Matsumoto et al.; Display Characteristics of In-Plane Switching (IPS) LCDs and a Wide-Viewing-Angle 14.5-in. OPS TFT-LCD; Euro Display '96; pp. 445-448.

H. Wakemoto et al.; "An Advanced In-Plane Switching Mode TFT-LCD"; SID 97 Digest; pp. 929-932.

S.H. Lee et al.; High-Transmittance, Wide-viewing-Angle Nematic Liquid Crystal Display Controlled by Fringe-Field Switching; Asia Display '98; pp. 371-374.

* cited by examiner

METHOD OF MANUFACTURING AN IPS LCD DEVICE HAVING A LIGHT SHIELDING LAYER UNDER AT LEAST ONE COMMON OR DATA ELECTRODES SO THAT LIGHT TRANSMITTANCE AREAS OF THE COMMON AND DATA ELECTRODES ARE THE SAME

CROSS-REFERERNCE TO RELATED APPLICATIONS

This application is a divisional of U.S. patent application Ser. No. 11/647,285, filed Dec. 29, 2006, now U.S. Pat No. 7,522,245,now allowed, which is a divisional application of U.S. patent application Ser. No.: 10/777,852, filed Feb. 13, 2004, now U.S. Pat. No. 7,173,682 which is a divisional of Ser. No. 09/892,879, now U.S. Pat. No. 6,724,454, filed Jun. 28, 2001, which claims priority to Korean Patent application No.: P2000-61934, filed Oct. 20, 2000, all of which are incorporated by reference for all purposes as if fully set fourth herein.

BACKGROUND OF THE INVENTION

1. Field of the Invention

The present invention relates to an Liquid Crystal Display (LCD) Device, and more particularly, to an in-plane switching mode LCD and a method of manufacturing the same.

2. Discussion of the Related Art

Twisted Nematic (TN) mode LCDs are generally used in current LCD devices. In the TN technique, electrodes are installed on each of two substrates and a liquid crystal (LC) director is arranged as a twisted 90°, then voltage is applied to the electrodes to drive the LC director.

However, TN mode LCDs have the disadvantage that the phase of light passing through the liquid crystal cell varies according to the direction of the light, causing a narrow viewing angle.

Recently, techniques have been actively developed for solving such a problem of the narrow viewing angle. Techniques for widening the viewing angle include a film-compensated mode for compensating the viewing angle with a compensating film, a multi-domain mode for dividing one pixel into several domains to vary the main viewing angle direction of each domain so that the pixel characteristic becomes the mean value of the several domain characteristics; an in-plane switching mode for applying a parallel electric field to twist the LC director in a plane parallel to an orientation film; a Vertical Alignment (VA) mode for using a negative liquid crystal and a vertically oriented film to vertically arrange the long axis of liquid crystal molecules about the oriented film; an Optically Compensated Birefringence (OCB) mode, and the like.

In the in-plane switching mode LCD, two electrodes are formed on one substrate for rotating the liquid crystal molecules in a plane parallel to the substrate. Voltage is applied between the two electrodes to induce an electric field parallel to the substrate, thereby reducing variation in birefringence of the liquid crystal.

Therefore, the in-plane switching mode LCD has excellent viewing angle characteristics compared to the TN mode LCD of the related art.

Hereinafter the in-plane switching mode LCD of the related art will be described with reference to the appended drawings as follows:

FIG. 1A is a plan view showing an in-plane switching mode LCD of the related art. FIG. 1B shows a cross section along line I-I' in FIG. 1A, and FIG. 1C shows a cross section along line II-II' in FIG. 1A.

FIG. 2A is a plan view for showing a general structure of an ITO-ITO electrode of the in-plane switching LCD. FIG. 2B shows transmitting and shielding areas of the ITO-ITO electrode of the in-plane switching LCD when positive DC voltage is applied to a data electrode. FIG. 2C shows the transmitting and shielding areas of the ITO-ITO electrode of the in-plane switching LCD when negative DC voltage is applied to the data electrode.

The general in-plane switching mode LCD as shown in FIG. 1A comprises data lines 10 and gate lines 11 arranged on a first substrate for defining a pixel area, a common line 12 arranged in the pixel area parallel to the gate lines 11, a thin film transistor placed in intersecting regions of the gate lines 11 and the data lines 10, data electrodes 14 arranged parallel to the data lines 10 in the pixels, common electrodes 13 extended from the common lines 12 and arranged between the data electrodes 14, and storage electrodes 55 extended from the data electrodes 14 and formed in the upper parts of the gate lines 11.

Referring also to FIG. 1B, the in-plane switching mode LCD is formed by joining the first substrate 18 and the second substrate 19 together in opposition to each other and injecting a liquid crystal layer 30 between the two substrates. The gate lines 11 are formed parallel to the common lines 12 on the first substrate 18. The common electrodes 13, which extend from the common lines 12, are commonly formed with the common lines 12. Here, a portion of the gate lines 11 functions as gate electrodes of the thin film transistor.

Then, a silicon nitride (SiNx) or a silicon oxide (SiOx) film is applied to the surface, including the gate lines 11 and the common electrodes 13, to form a gate insulation film 20, and a semiconductor layer 15 is formed on a portion of the gate insulation film as an active layer.

Next, the data lines 10 are formed on top of the gate insulation film 20 to form a matrix shape with the gate lines 11, and source/drain electrodes 16 and 17 are simultaneously formed to extend from the data lines 10 and be placed on a semiconductor layer 15. Here, the data electrodes 14 parallel to the common electrodes 13 and the storage electrodes 55 are formed at the same time, which connect the data electrodes 14.

The gate electrodes, the gate insulation film 20, the semiconductor layer 15, the source/drain electrodes 16 and 17 form the thin film transistor.

Then, a silicon oxide film, a silicon nitride film or an organic insulation film such as a BCB (Benzocyclobutene) film is applied on the surface, including the data lines 10, to form a protective film 25.

In the in-plane switching LCD, the common electrodes and the data electrodes can be formed on different planes, with the insulation film sandwiched as above or can be formed on one plane.

Also, the common electrodes and the data electrodes can be formed simultaneously with the lines made of metals including Cu, Al, Cr, Mo, Ti, Al alloy and the like for shielding a light, or a transparent conductive material such as ITO (Indium Tin Oxide) can be used in forming the same by further using a mask. When forming the electrodes using a mask, however, care should be used to avoid a short between the lines or electrodes.

When the data electrodes 14 and the common electrodes 13 are formed of ITO, which is a transparent conductive film that is excellent in transmitting light, the LCD is called an ITO ITO in-plane switching LCD. A general structure of an ITO-ITO electrode is shown in FIG. 2.

A black matrix 21 is formed on the second substrate 19 to prevent light leakage, and an R, G, B color filter layer 22 is formed between the black matrix 21.

An overcoat layer 23 is formed on top of the color filter layer 22 to protect and planarize the color filter layer 22.

The ITO-ITO in-plane switching LCD formed as above has a horizontal or parallel electric field rather than a vertical electric field between the data and common electrodes, a vertical electric field in a middle portion of the electrodes, and horizontal or parallel and vertical electric fields commonly formed at corners of the electrodes.

Initially, the liquid crystal molecules between the electrodes are rotated parallel to the substrate due to a side electric field. After a certain time period, the liquid crystal molecules on the electrodes are rotated due to the vertical and side electric fields and an elastic force of the liquid crystal at the electrodes.

In an ITO-ITO in-plane switching LCD, the liquid crystal molecules on the electrodes have an orientation according to positive or negative voltage applied to the electrodes, thereby causing light transmissivity to be different at the data electrodes and the common electrodes.

In other words, when a positive DC voltage is applied to the data electrodes and a negative DC voltage is applied to the common electrodes, light is transmitted in a larger amount at the common electrodes than at the data electrodes, as shown in FIG. 2B. Also, when a negative DC voltage is applied to the data electrodes and a positive DC voltage is applied to the common electrodes, light is transmitted in a larger amount at the data electrodes 14, as shown in FIG. 2C.

In other words, a luminance difference is created at each electrode depending on whether a positive or negative voltage is applied.

As shown herein before, the foregoing in-plane switching LCD of the related art has the following problems.

To reduce degradation due to malfunction of the liquid crystal and to improve definition (picture quality), the common electrodes at the outermost position in the pixels are opposed and shielded with the black matrix layer on the substrate. Thus, the common electrodes and the data electrodes in a unit pixel have different the transmitting areas, which causes a luminance difference according to positively or negatively applied voltage. Flickers and residual images are generated because of the luminance difference, thus lowering reliability of the display device.

SUMMARY OF THE INVENTION

Accordingly, the present invention is directed to an in-plane switching mode liquid crystal display device and method of manufacturing the same that substantially obviates one or more of the problems due to limitations and disadvantages of the related art.

It is therefore an object of the invention to provide an in-plane switching mode LCD in which the light transmitting area the same with respect to data electrodes and common electrodes to improve definition (picture quality), and a manufacturing method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages in accordance with the purpose of the present invention, as embodied, and broadly described, An in-plane switching liquid crystal display device, comprises first and second substrates; a plurality of data lines on the first substrate; a plurality of gate lines crossing the data lines on the first substrate, perpendicular to the data lines; a plurality of pixel areas on said first substrate defined by the data and gate lines; data electrodes and common electrodes alternately formed in each of said pixel areas, the data electrodes having a first transmittance area and the common electrodes having a second transmittance area, wherein the first transmittance area equals the second transmittance area; and a liquid crystal layer between said first and second substrates.

In another aspect of the present invention, an in-plane switching mode LCD comprises: first and second substrates; a plurality of pixel areas on the first substrate; data electrodes and common electrodes alternately formed in each of the pixel areas and patterned to have the same light transmitting area according to applied voltage; and a liquid crystal layer between the first and second substrates.

In another aspect of the present invention, a method of manufacturing an in-plane switching mode LCD includes the preparing the first and second substrates; forming a plurality of gate lines and data lines on the first substrate to define a plurality of pixel areas; forming a plurality of data electrodes and common electrodes to be alternately formed in each pixel and have the same light transmitting area in applying voltage; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiment of the present invention, example of which is illustrated in the accompanying drawings.

Figure 1A:
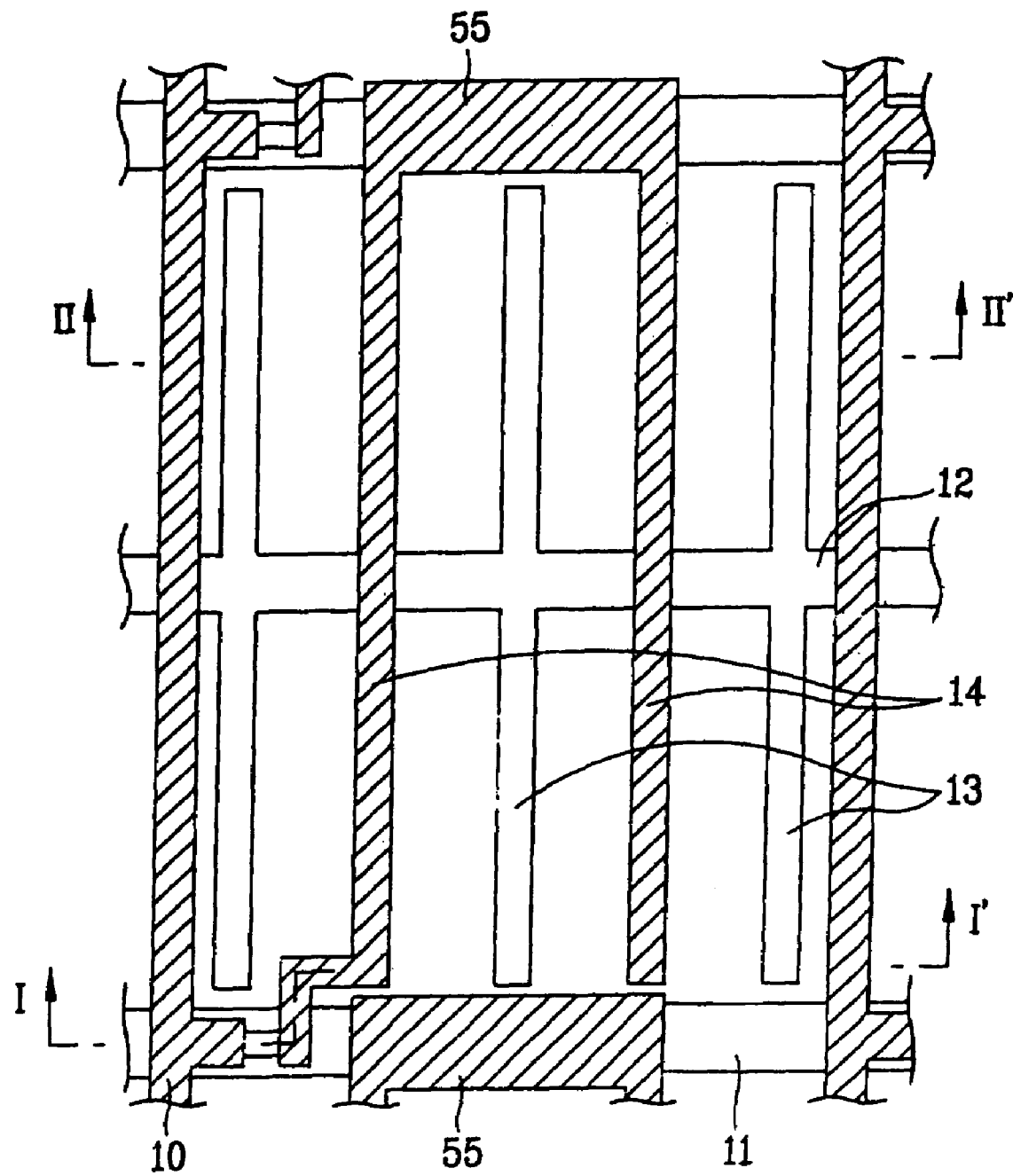
FIG. 1A is a plan view an in-plane driving mode LCD of the related art.
Figure 1B:
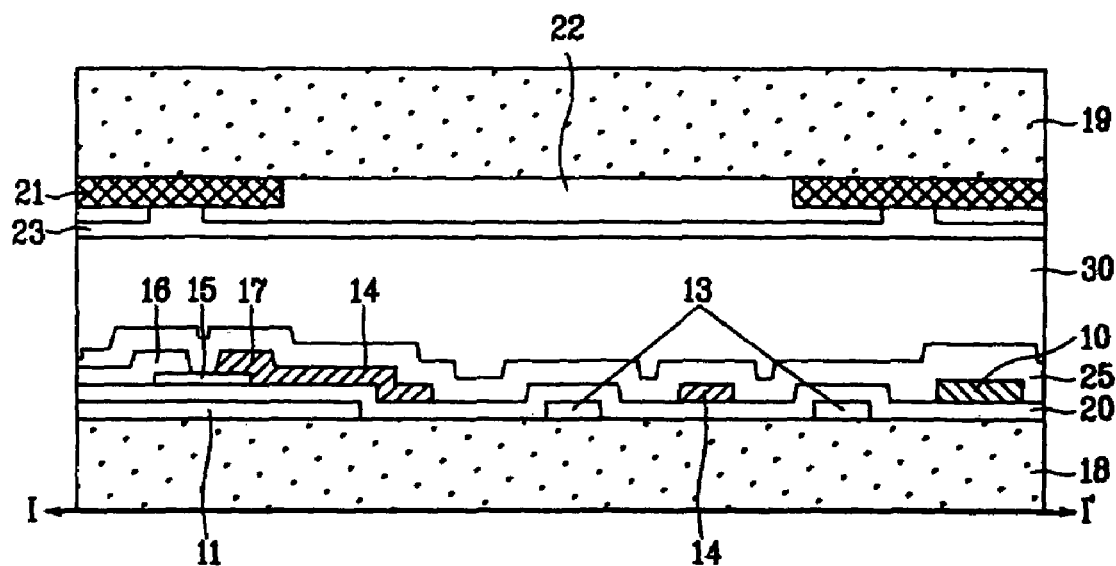
FIG. 1B shows a cross section along a line I-r of FIG. 1A.
Figure 1C:
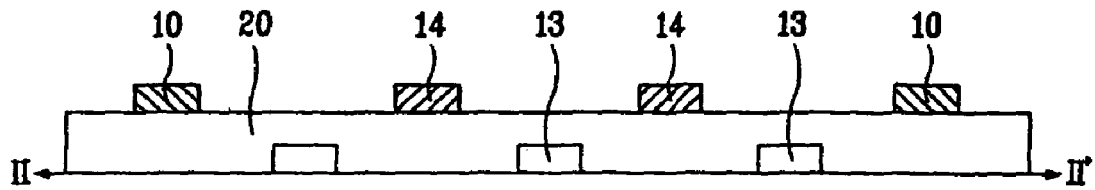
FIG. 1C shows a cross section along a line II-II of FIG. 1A.
Figure 2A:
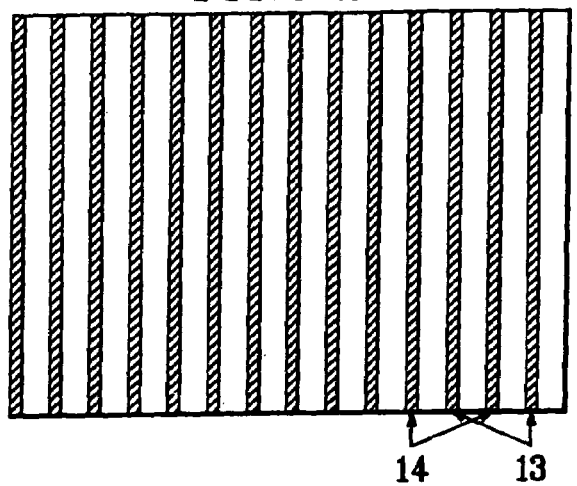
FIG. 2A is a plan view for showing a general structure of an ITO-TO electrode of the in-plane switching LCD.
Figure 2B:
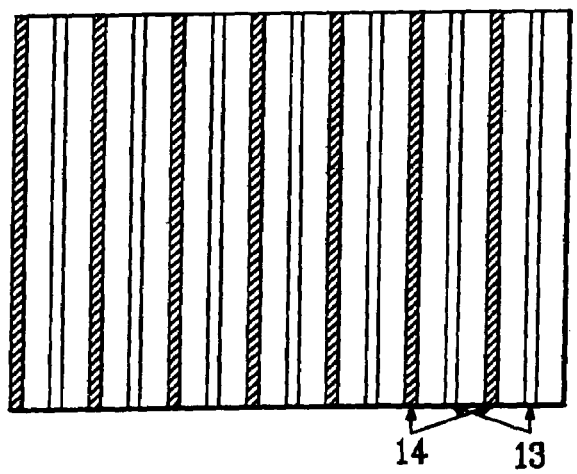
FIG. 2B shows transmitting and shielding areas when a positive DC voltage is applied to a data electrode.
Figure 2C:
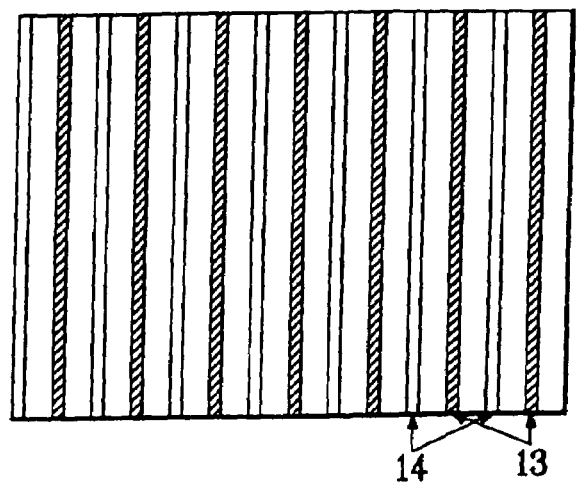
FIG. 2C shows the transmitting and shielding areas when a negative DC voltage is applied to the data electrode.
Figure 3A:
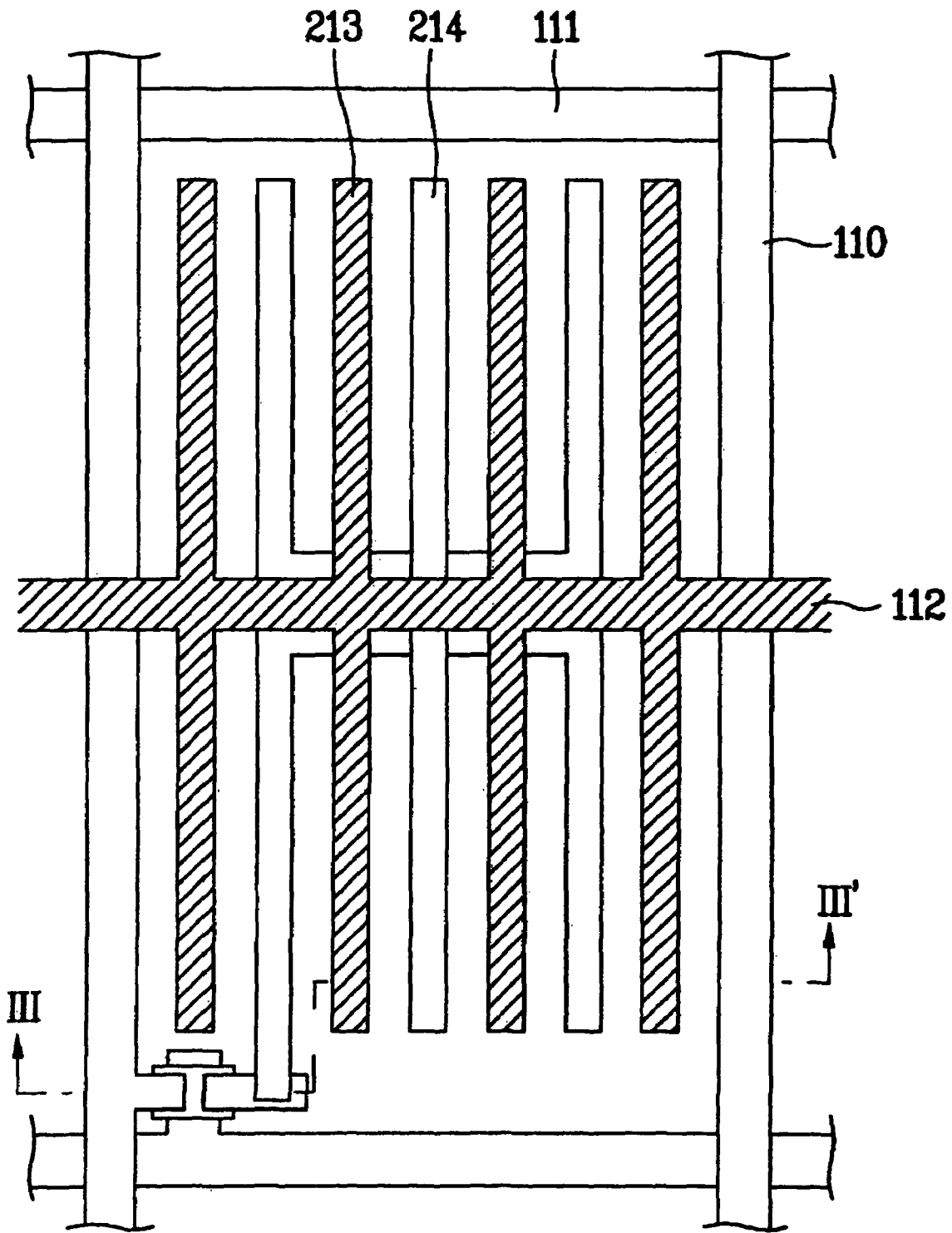
FIG. 3A is a plan view of an embodiment of an in-plane switching mode LCD of the present invention.
Figure 3B:
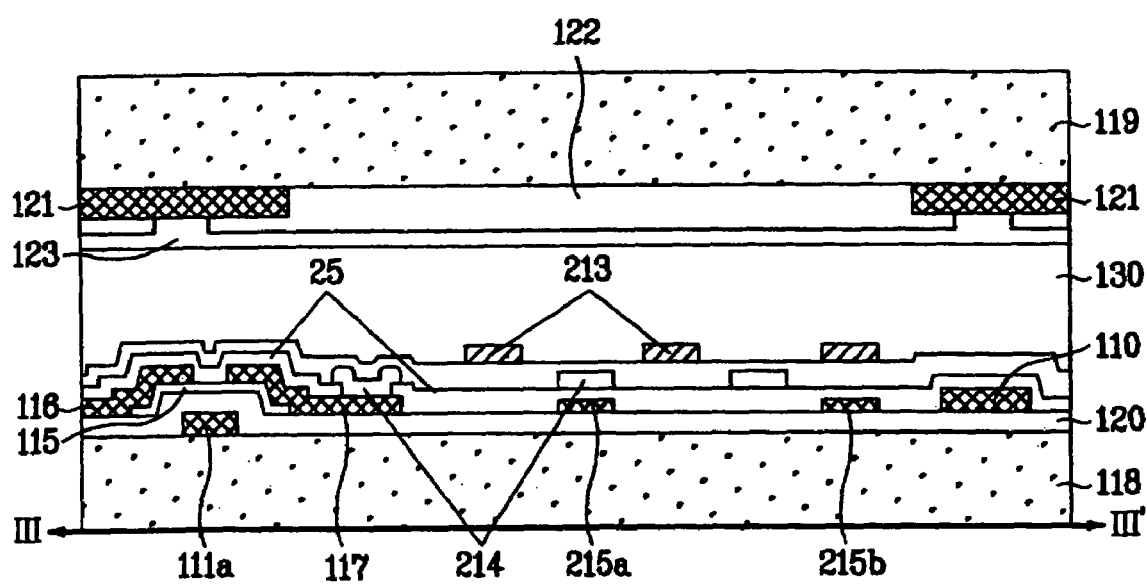
FIG. 3B shows a cross section along a line III-III' of FIG. 3A.

FIG. 3A is a plan view showing an in-plane switching mode LCD of the present invention, and FIG. 3B shows a cross section along line III-III' in FIG. 3A.

Figure 4A:
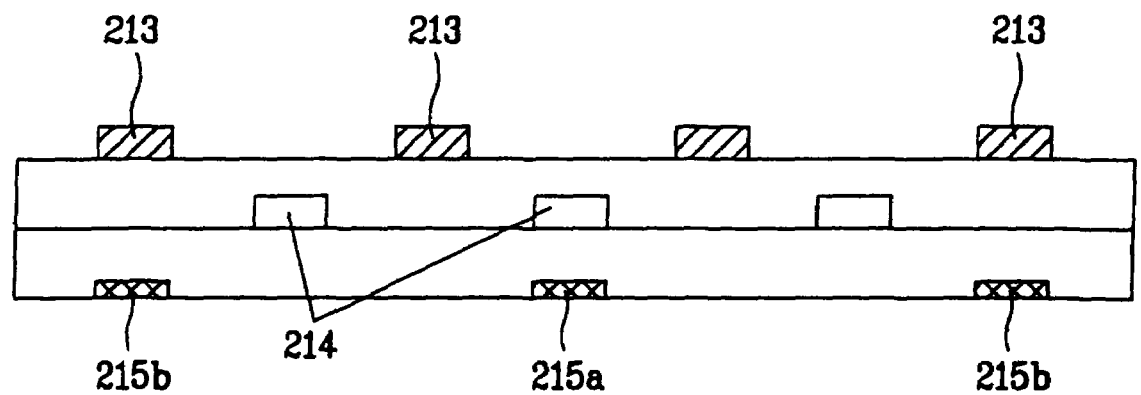
FIG. 4A shows a cross section of a main part of an in-plane switching mode LCD according to a first embodiment of the present invention.
Figure 4B:
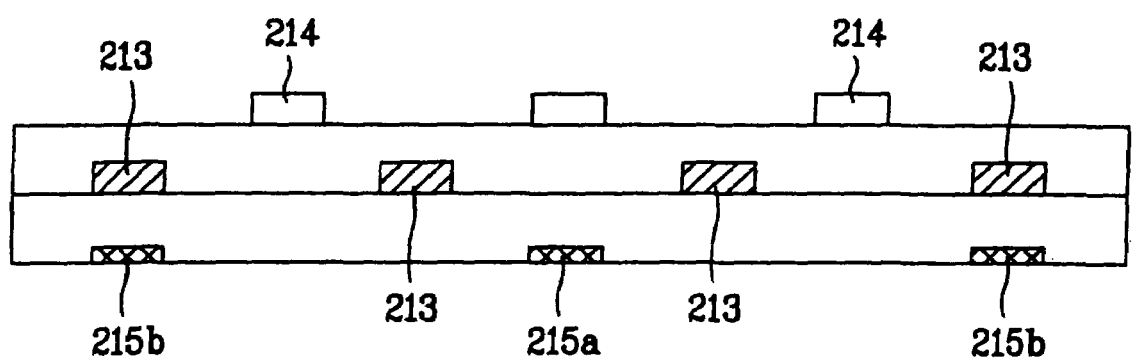
FIG. 4B shows a cross section of a main part of an in-plane switching mode LCD according to a second embodiment of the present invention.
Figure 4C:
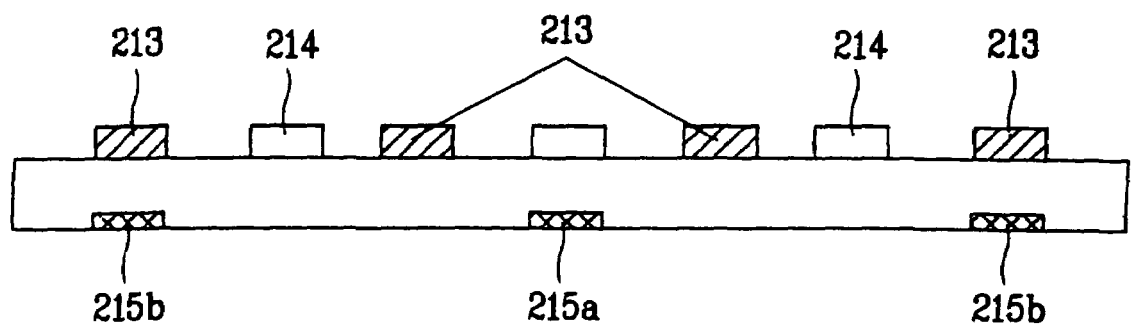
FIG. 4C shows a cross section of a main part of an in-plane switching mode LCD according to a third embodiment of the present invention.

FIG. 4A shows a cross section of a main part of an in-plane switching mode LCD according to the first embodiment of the present invention. FIG. 4B shows a cross section of a main part of an in-plane switching mode LCD according to the second embodiment of the present invention. FIG. 4C shows a cross section of a main part of an in-plane switching mode LCD according to the third embodiment of the present invention.

Figure 5:
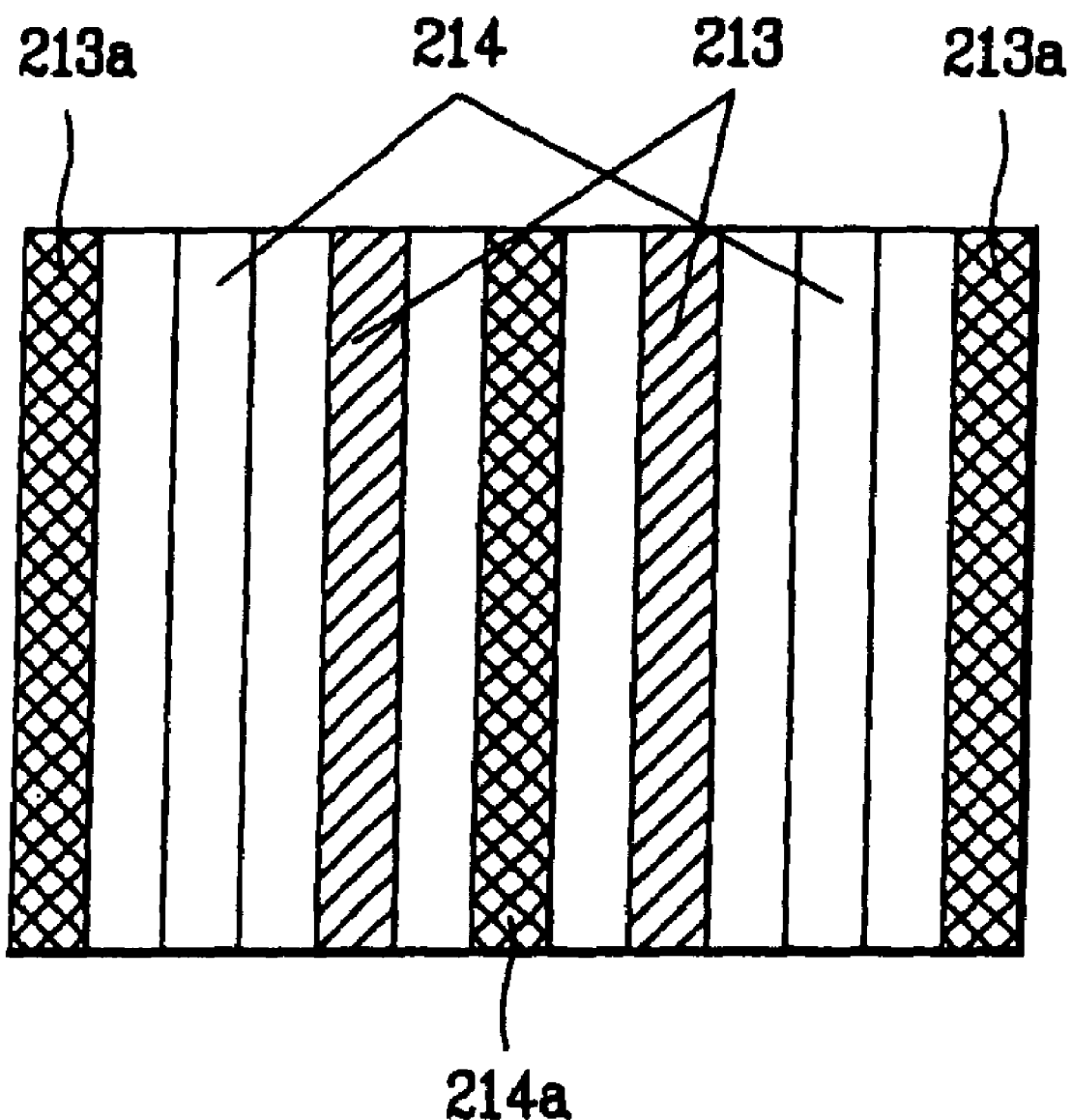
FIG. 5 shows a screen on a display according to one of the first to fourth embodiments of the present invention.

FIG. 5 shows a screen on a display according to one of the first to fourth embodiments of the invention.

First, explaining the method of manufacturing the in-plane switching mode LCD according to the first embodiment in reference to FIG. 3A to FIG. 3B, a low resistance metal layer is deposited and patterned to form gate lines 111 and a gate electrode 111a, which extends from the gate lines 111 and is the gate electrode of a thin film transistor.

Then, a silicon nitride (SiNx) or a silicon oxide (SiOx) film is deposited on the surface of the gate lines 111 to form a gate insulation film 120, and a semiconductor layer 115 is formed on the gate insulation film 120 over the gate electrodes 111a using amorphous silicon.

Then, a low resistance metal is deposited on the gate insulation film 120 followed and patterned to form data lines 110 in a matrix with the gate lines 111, so that data lines 110 together with the gate lines define a unit pixel area.

Here, source/drain electrodes 116 and 117 of a thin film transistor are formed simultaneously with the data lines 110.

Here, the gate electrodes, gate insulation film, semiconductor layer, source/drain electrodes from the thin film transistor.

Then, as shown in FIG. 4A, shielding layers 215b are formed under a position where the outermost ones of common electrodes 213 in a unit pixel will be formed later. A shielding layer 215a is formed under a position where one of the data electrodes 214 in the unit pixel will be formed later, so that the common electrodes and the data electrodes in the unit pixel have the same light transmitting area.

The data lines are formed of metals including Cu, Al, Cr, Mo, Ti, Al alloy and the like for shielding light, therefore an additional process is not necessary to form shielding layers 215a and 215b under the common electrodes and the data electrodes.

Here, the outermost common electrodes in the unit pixel are shielded to reduce the influence of the electric field at both ends in the unit pixel about the liquid crystal, where the behavior of the liquid crystal is unclear when voltage is applied. Because the electric field between the outermost common electrode and an adjacent unit pixel data line is unknown, the outermost common electrode is shielded by a black matrix. In addition instead of being formed of ITO, the outermost common electrodes can be formed of an opaque metal that can shield light. Alternatively, the black matrix on the second substrate can be extended to the area of the outermost common electrodes.

Then, the plurality of data electrodes 214 are formed and are electrically connected with the drain electrode 117 and parallel to the data lines; and the common electrodes 213 are formed at the positions corresponding to positions between the data electrodes 214. That is, the data electrodes 214 and the common electrodes 213 have an alternating pattern.

Here, the common electrodes 213 can be formed under the data electrodes 214, i.e., on a layer different from the data electrodes 214 as shown in FIG. 4B. Alternatively the common electrodes 213 can be formed with the data electrodes, i.e., on the same layer as the data electrode 214 as shown in FIG. 4C.

Referring again to FIG. 3B, meanwhile, a black matrix 121 is formed on the second substrate 119 for preventing leakage of light, and a color filter layer 122 is formed between the black matrix 121.

Finally, the first substrate 118 and the second substrate 119 are assembled to oppose each other, and a liquid crystal layer 130 is injected between the substrates 118 and 119 to complete the in-plane switching mode LCD.

Here, the data electrodes 214 and the common electrodes 213 are formed of ITO which is a transparent conductive film excellent in transmitting light.

In such an in-plane switching mode LCD of the invention, the light transmitting area through the data electrodes and the light transmitting area through the common electrodes are the same even if the outermost common electrodes in the unit pixel are shielded, so that the luminance difference due to a positive or negative applied DC voltage is prevented.

Meanwhile, as the fourth embodiment of the invention, the outermost common electrodes in the unit pixel can be formed of a shielding metal capable of shielding a light instead of the transparent conductive film. In this case, it is unnecessary to form an additional shielding layer or to extend the black matrix.

The first to fourth embodiments of the invention, as discussed above, have the alternating common electrodes 213 and data electrodes 214 in the unit pixel area. At least one data electrode 214a of the data electrodes in the unit pixel is shielded to make the common electrodes have the same light transmitting area as the data electrodes, so that the difference between the light transmitting areas of the common electrodes and the data electrodes occurring when the outermost common electrodes 213a are shielded as shown in FIG. 5.

Figure 6A:
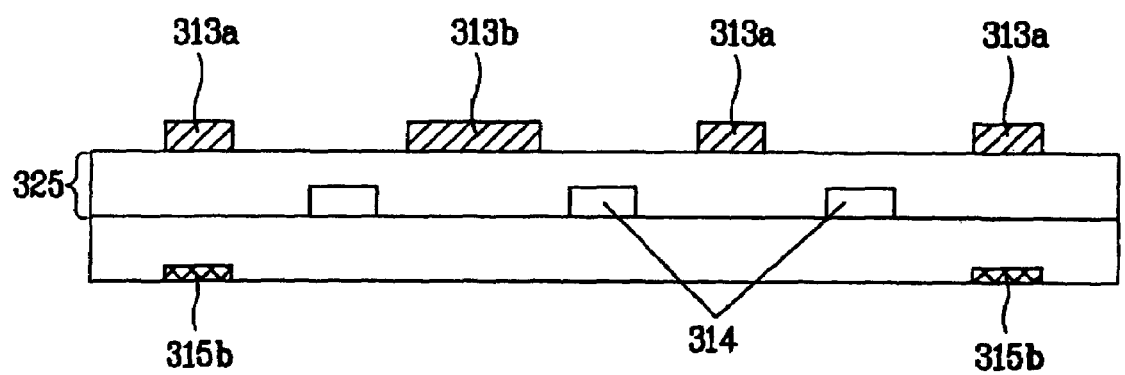
FIGS. 6A and 6B show a cross sections of a main part of an in-plane switching mode LCD according to the fifth embodiment of the present invention.
Figure 6B:
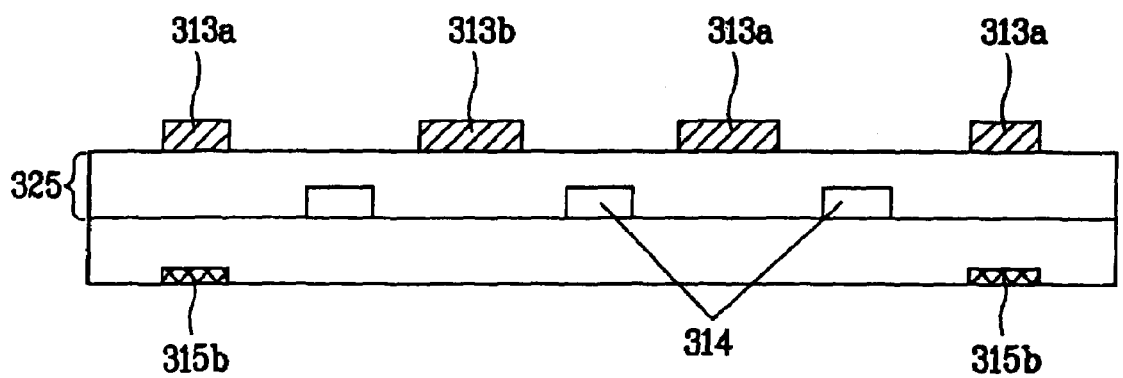
Figure 7A:
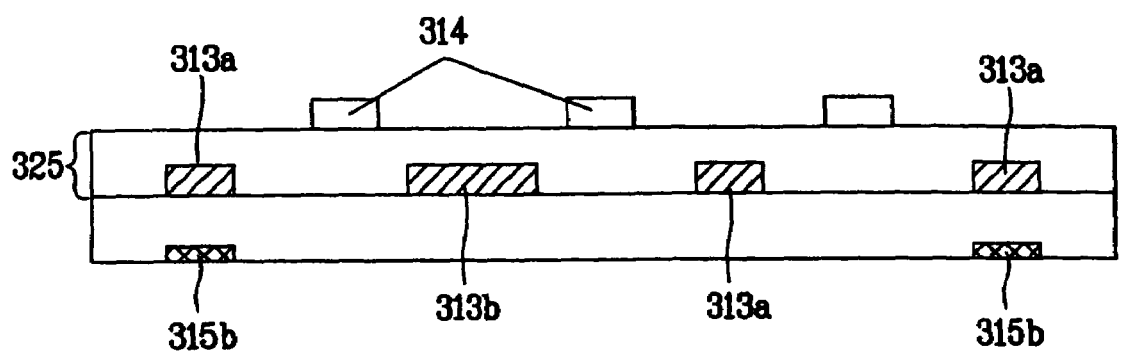
FIGS. 7A and 7B show a cross sections of a main part of an in-plane switching mode LCD according to the sixth embodiment of the present invention.
Figure 7B:
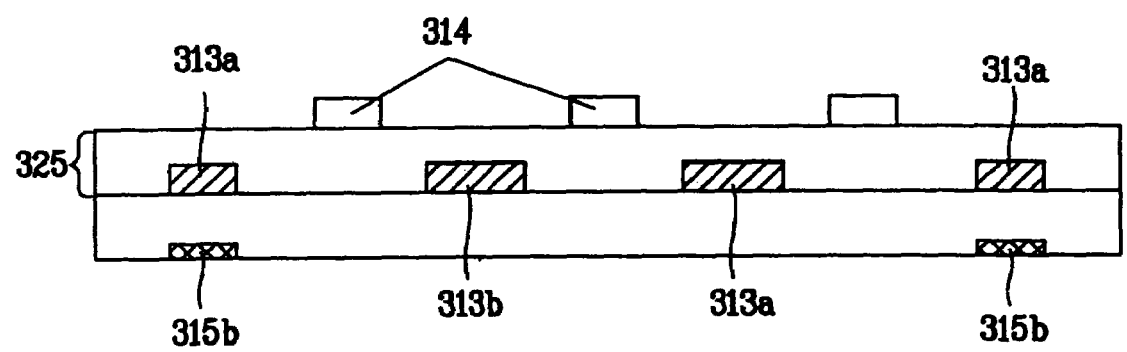
Figure 8A:
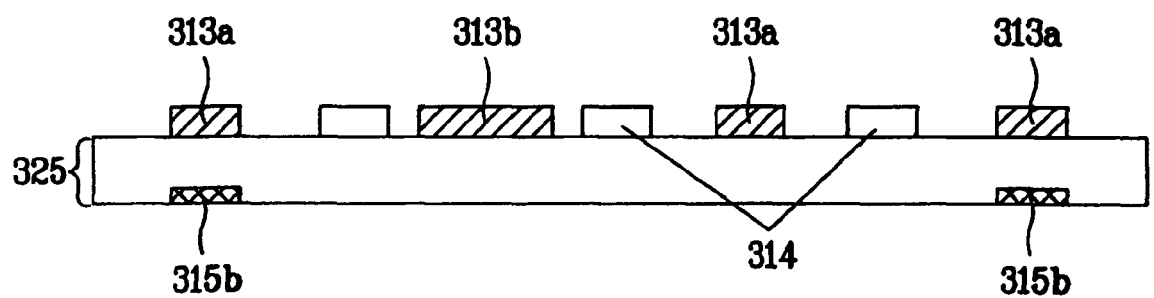
FIGS. 8A and 8B shows a cross section of a main part of an in-plane switching mode LCD according to the seventh embodiment of the present invention.
Figure 8B:
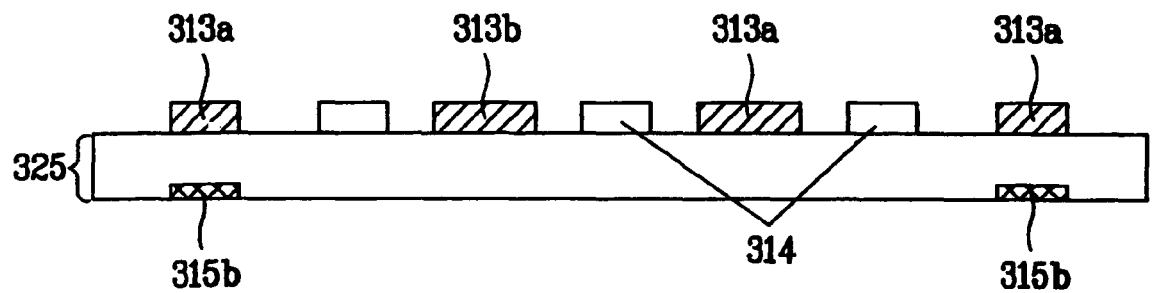

Meanwhile, FIGS. 6A and 6B show a cross sections of a main part of an in-plane switching mode LCD according to the fifth embodiment of the invention. FIGS. 7A and 7B show a cross section of a main part according to the sixth embodiment of the invention. FIGS. 8A and 8B show a cross section of a main part of an in-plane switching mode LCD according to the seventh embodiment of the invention, in which width of at least one common electrode is patterned wider than that of data electrodes.

In other words, instead of one of the data electrodes being shielded according to the first to fourth embodiments of the present invention, one of the common electrodes is formed wider in width than the data electrodes of the fifth to seventh embodiments of the present invention, so that the common electrodes and the data electrodes have the same light transmitting area. For example, one common electrode can be formed to be twice the width of one of the data electrodes, so that, e.g., two common electrodes that transmit light can have the same area as three data electrodes that transmit light. Alternatively, two common electrodes can be formed to be 1.5 times the width of one of the data electrodes, so that, e.g., two common electrodes can have the same area as three data electrodes.

As not shown in the drawings, gate lines and gate electrodes are formed on the first substrate. A gate insulation film is formed on the surface including the gate lines. Then, the semiconductor layer is formed on the gate insulation film on the gate electrodes.

Then, data lines are formed on the gate insulation film to form a matrix with the gate lines to define unit pixel areas. Source and drain electrodes are formed at the same time as the data lines.

Here, the gate electrodes, gate insulation film, semiconductor layer, source and drain electrodes form the thin film transistor.

Consequently, when the data lines are formed, a plurality of data electrodes 314 are formed to be electrically connected with the drain electrode and parallel to the data lines and the common electrodes 313a and 313b. Shielding layers 315b are formed of the same material as that of the data lines to be under some outermost ones of a plurality common electrodes 313a and 313b which will be formed later. The common electrodes 313a and 313b alternate with the data electrodes 314. At least one of the plurality of common electrodes is formed wider in width than that of the adjacent data electrode.

For example, when the common electrodes and the data electrodes have substantially the same width and the number of the data electrodes is one more than that of the common electrodes, one of the common electrodes is formed to have two times the width of the data lines, so that the common electrodes and the data electrodes have the same light transmitting area overall.

Here, an insulation film 325, on which the data electrodes 314 can be formed, may be formed on the surface including the common electrodes 313a and 313b as shown in FIG. 6B, and the common electrodes 313a and 313b can be formed with the data electrodes 314.

Meanwhile, a black matrix is formed on the second substrate for preventing light leakage, and a color filter layer is formed in the black matrix as not shown in the drawings.

Finally, the first and second substrates are assembled to oppose each other, and a liquid crystal layer is injected between the two substrates to complete the in-plane switching mode LCD.

Here, the data electrodes 314 and the common electrodes 313 are ITO, except that the outermost common electrodes, shown in FIG. 6A to FIG. 6C, can be formed of a shielding metal which can shield light.

Figure 9:
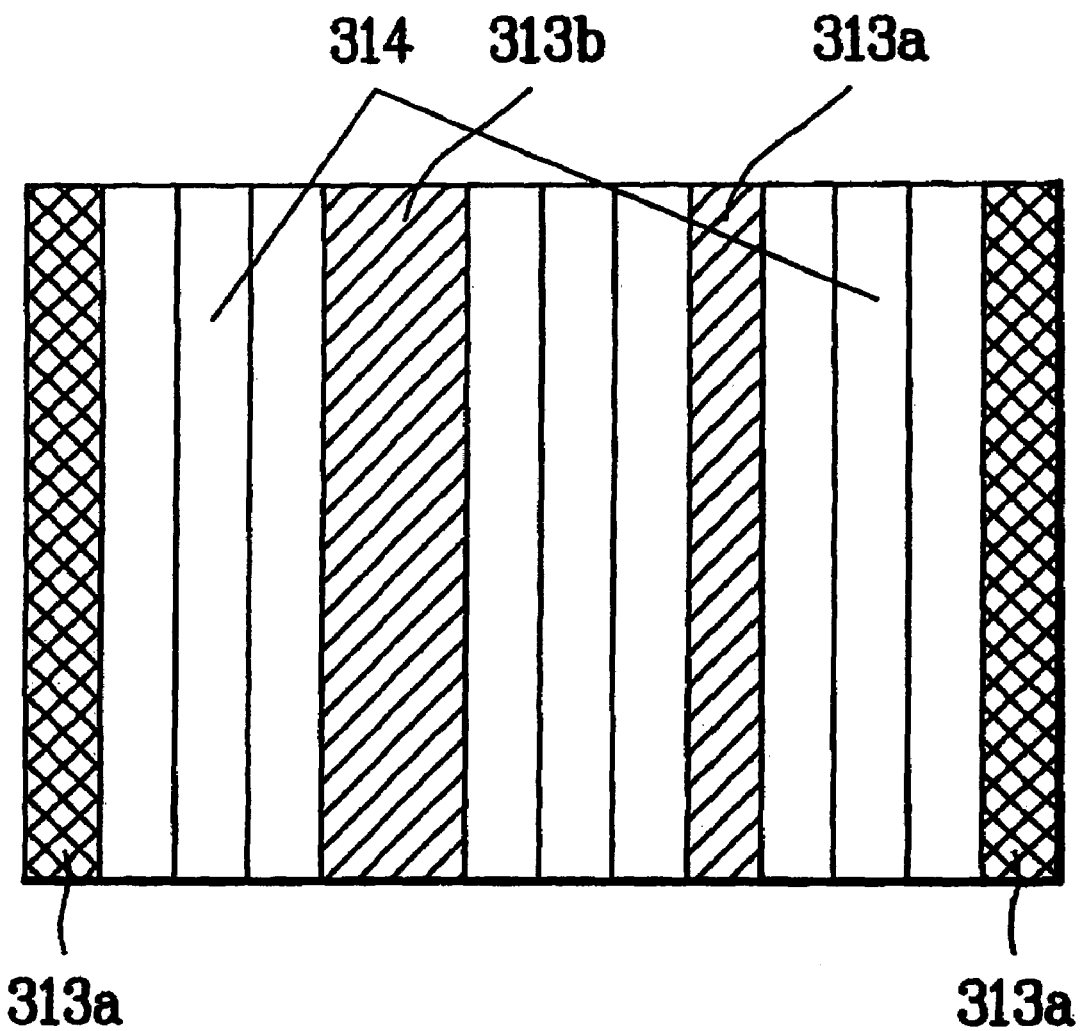
FIG. 9 shows a screen on a display according to one of the fifth to seventh embodiments of the present invention.

According to the fifth to seventh embodiments of the present invention as described herein before, the common electrodes are patterned wider than the data electrodes so that the common electrodes and the data electrodes have the same light transmitting area, as shown in FIG. 9.

The non-shielded area of the common electrodes is smaller than the area of the data electrodes because the outermost common electrodes are shielded. Thus, according to the present invention the common electrodes are patterned wider to have the same area as the data electrodes.

In reference, the data electrodes and the common electrodes can be formed in various forms such as a zigzag type instead of a stripe type.

Such a method of manufacturing the in-plane switching mode LCD according to the invention has the following effects:

First, the data electrodes and the common electrodes in the unit pixel have the same light transmitting area to eliminate the luminance difference caused by positive or negative DC voltage, thereby improving the problem of flickers and residual images caused by the luminance difference. Therefore, image quality and reliability of the display is enhanced.

Second, the process of shielding the common electrodes and the data electrodes are carried out at the same time as the data line or gate line forming process so that the overall process can be simplified, thereby minimizing process time.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing an in-plane switching liquid crystal display device comprising:
   preparing the first and second substrates;
   forming a plurality of gate lines on the first substrate;
   forming an insulation film over a surface of the pixel area including the gate lines;
   forming the data lines and light shielding layers each having a predetermined width on the insulation film;
   forming a first protective film on the surface including the light shielding layers;
   forming a plurality of common electrodes on the first protective film;
   forming a second protective film on the surface including the common electrodes;
   forming a plurality of data electrodes on the second protective film, the data electrodes and the common electrodes to be alternately formed in each pixel area and having the same light transmitting area; and
   forming a liquid crystal layer between the first and second substrates,
   wherein each outer most common electrode of the plurality of common electrodes in the unit pixel is substantially vertically aligned with each of the light shielding layers and each of the data electrodes is formed in each area between two adjacent common electrodes.

2. The method of claim 1, further comprising another light shielding layer under one data electrode, wherein the light shielding layers and another light shielding layer are formed together and same time with the data lines.

3. The method of claim 2, wherein the light shielding layers are formed of the same material as the data lines.

4. The method of claim 1, wherein said light shielding layers are formed of the same material as the data lines.

5. A method of manufacturing an in-plane switching liquid crystal display device comprising:
   preparing the first substrate;
   forming an insulation film over the first substrate including gate lines;
   forming light shielding layers having a predetermined width over the first substrate and;
   forming a first protective film over the first substrate including the shielding layers;
   forming common electrodes on the first protective film;

forming a second protective film on the surface including the common electrodes;

forming a plurality of data electrodes on the second protective film, the data electrodes and the common electrodes to be alternately formed in an unit pixel area, the plurality of data electrodes and common electrodes having the same light transmitting area, and wherein the light shielding layer is formed under outer most ones of the common electrodes and wherein each outer most common electrode of the plurality of common electrodes in the unit pixel is substantially vertically aligned with each of the shielding layers.

6. The method of claim 5, further comprising:

forming data lines on the insulation film when the shielding layer is formed;

preparing a second substrate; and forming a liquid crystal layer between the first and second substrates.

7. The method of claim 5, further comprising another light shielding layer under one data electrode, wherein the light shielding layers and another light shielding layer are formed together and same time with the data lines.

8. The method of claim 6, wherein said light shielding layers are formed of the same material as the data lines.

9. The method of claim 5, wherein each of the data electrodes are deposed between the common electrodes and parallel with the common electrodes.

* * * * *